__United States Patent__ [19]

Aritsuka et al.

[11] Patent Number: 5,728,642

[45] Date of Patent: Mar. 17, 1998

[54] EXHAUST GAS TREATING AGENT AND A METHOD OF TREATING EXHAUST GAS USING THE AGENT

[75] Inventors: Makoto Aritsuka; Sadaichi Komohara; Isao Harada, all of Shimonoseki, Japan

[73] Assignee: Mitsui Toatsu Chemicals, Inc., Tokyo, Japan

[21] Appl. No.: 383,231

[22] Filed: Feb. 3, 1995

[30] Foreign Application Priority Data

Feb. 3, 1994 [JP] Japan ................................. 6-011442
Jun. 24, 1994 [JP] Japan ................................. 6-142807

[51] Int. Cl.$^6$ ................ B01J 27/06; B01J 27/122; B01J 27/128; B01J 20/34
[52] U.S. Cl. ................ 502/224; 502/225; 502/226; 502/229; 502/35; 502/36
[58] Field of Search ................ 502/224, 225, 502/226, 229, 35, 36

[56] References Cited

U.S. PATENT DOCUMENTS

| | | | |
|---|---|---|---|
| 4,017,551 | 4/1977 | Milam et al. | 502/224 |
| 4,032,474 | 6/1977 | Goudriaan et al. | 502/224 |
| 4,275,046 | 6/1981 | McVicker et al. | 205/224 |
| 5,108,977 | 4/1992 | Yoshida et al. | 502/304 |
| 5,183,647 | 2/1993 | Harada et al. | 423/239.1 |
| 5,417,948 | 5/1995 | Iwata et al. | 423/239.1 |

FOREIGN PATENT DOCUMENTS

| | | |
|---|---|---|
| 61-204025 | 9/1986 | Japan . |
| 62-237929 | 10/1987 | Japan . |
| 5 261247 | 10/1993 | Japan . |

OTHER PUBLICATIONS

"Gmelins Handbuch der Anorganischen Chemie", No. 5, vol. 1, 1959, pp. 244–245 month not available.

Patent Abstracts of Japan, vol. 15, No. 431 (0881), Nov. 5, 1991, JP–3–181316, Aug. 7, 1991.

Patent Abstracts of Japan, vol. 10, No. 185 (C–357), Jun. 27, 1986, JP–61–035830, Feb. 20, 1986.

Gmelins Handbuch, vol. F:S vol. 1, pp. 244–246, 1959 month not available.

*Primary Examiner*—Glenn Caldarola
*Assistant Examiner*—Patricia L. Hailey
*Attorney, Agent, or Firm*—Oblon, Spivak, McClelland, Maier & Neustadt, P.C.

[57] ABSTRACT

There is provided with a method of treating an exhaust gas comprising the steps of loading into a column an exhaust gas treating agent containing as a main component a metal of which surface is fluorinated previously; passing through the column the exhaust gas containing nitrogen trifluoride as a component to be treated; and contacting the exhaust gas with the exhaust gas treating agent. And the exhaust gas treating agent is also provided.

9 Claims, No Drawings

EXHAUST GAS TREATING AGENT AND A METHOD OF TREATING EXHAUST GAS USING THE AGENT

BACKGROUND OF THE INVENTION

1. Field of the Invention

The present invention relates to an exhaust gas treating agent and a method of treating an exhaust gas using the agent to detoxify gases exhausted in an IC production process.

2. Description of the Related Art

Nitrogen trifluoride ($NF_3$) is stable at a room temperature and is thus easy in handling and preservation, while applicable as a strong fluorinating agent in a high-temperature or plasma atmosphere. When fluorinating a material with $NF_3$, a residue derived from $NF_3$ is gas mainly formed of nitrogen. These features make $NF_3$ be applicable as a dry etching agent in IC production process and as a cleaning gas for IC production equipment. Accordingly, demands of $NF_3$ have increased in recent years.

While useful in various fields, $NF_3$ is toxic and an allowable concentration thereof is thus limited to 10 ppm. With this respect, the gas containing $NF_3$ exhausted from the IC production equipment should be detoxified (or treated) before being discharged into the air. $NF_3$ is, however, stable at a room temperature and is hardly dissolved into water so as to prevent easy treatment of $NF_3$.

Some methods are suggested to treat such exhaust gas, which are classified into two groups: a method of treating $NF_3$ through contact with a solid agent and a method of treating it in flame provided by combustion of a fuel such as hydrogen. The former is a method of fixing fluorine contents in $NF_3$ as a solid fluoride, and is more simple and easy as compared with the latter method. In addition, an apparatus for this former method can be simplified in structure.

The term "removal of $NF_3$" used herein means to convert a fluorine component (F) into easily decomposable or less toxic fluoride. Since $NF_3$ is higher in thermodynamic potential than other fluorides, it decomposes to convert other chemical species into fluoride through a spontaneous reaction from the thermodynamic viewpoint. This means that a wide variety of chemical species can be used in principle as the solid agents.

There are cases where $NF_3$ is subjected to reaction with chemical species including $I_2$, B, P, Si, As, Sb, alkali metals, alkali earth metals, Zn, Cd, Al, Fe, Cu, and $SiO_2$ (GMELIN HANDBUCH, Volume F:S Vol. 1, pages 244–245, 1959). These chemical species may be "candidate" solid agents for the treatment. As examples, Japanese Patent Laid-open Nos. 62-237929 and 61-204025 disclose the method of treating $NF_3$ through contact with a solid agent. More specifically, Japanese Patent Laid-open No. 62-237929 discloses to treat $NF_3$ through contact with activated carbon at a reaction temperature from 300° to 600° C. This method produces mainly carbon tetrafluoride ($CF_4$) that has less or no toxicity. $CF_4$ is out of restriction and can thus be discharge into the air. To discharge it into the air is, however, not preferable by the consideration of preventing global warming. On the other hand, Japanese Patent Laid-open No. 61-204025 discloses removal of $NF_3$ from a gas by contacting the gas with, for example, silicon at from 200° to 800° C. $NF_3$ contacted with silicon produces silicon tetrafluoride ($SiF_4$) which is toxic but can be decomposed easily. This method, however, requires facilities to decompose and treat $SiF_4$. As a result, the treatment process is not always simple.

The above mentioned methods both allow easy handling of the solid agent and provide a greater treatment capacity, which is defined as the volume of $NF_3$ treated with a unit volume of the agent. It is, however, necessary in practice to contact the exhaust gas containing $NF_3$ with the solid agent at a high temperature. This complicates the structure of the apparatus due to the necessity of maintaining the entire agent at a high temperature when a large amount of agent is filled in a larger column.

Improvement of the above mentioned methods is disclosed in Japanese Patent Laid-open No. 5-261247. In this method, an activated catalyst based on nickel is ground into fine particles which are activated with hydrogen gas at 180°–200° C. The resultant agent is contacted with the exhaust gas containing $NF_3$. This method produces substantially only nitrogen as a product so as to avoid usage of an additional treating apparatus. In addition, this method permits treatment at a relatively low temperature. The method is, however, small in treatment capacity as compared with other methods using activated carbon or silicon as the agent. Further, reactivity (activity) of this nickel-based catalyst with $NF_3$ is deteriorated when contacted with the air. This makes handling of the catalyst difficult.

As mentioned above, the conventional methods using a solid agent should be improved by the practical considerations due to the problems of, for example, a high temperature required for reaction, the supplemental facilities to treat toxic chemical species produced as a result of the reaction, a smaller treatment capacity, and difficult handling of the solid agent.

SUMMARY OF THE INVENTION

The present invention is directed to overcome the above mentioned problems and an object thereof is to provide an exhaust gas treating agent and a method of treating an exhaust gas by using the agent.

More specifically, the object of the present invention is to provide an agent of treating an exhaust gas containing $NF_3$ and a method of treating the exhaust gas by using the agent, in which the agent is stable in the air, is relatively easy in handling, does not requires a high temperature for reaction, and has a treating capacity comparative to that of conventional ones, and in which the treated exhaust gas contains no such chemical species that requires subsequent treatment.

According to the present invention, there are provided with an exhaust gas treating agent containing as a main component a metal of which surface is fluorinated previously, and also provided with a method of treating an exhaust gas comprising the steps of loading the exhaust gas treating agent into a column; passing through the column the exhaust gas containing nitrogen trifluoride as a component to be treated; and contacting the exhaust gas with the exhaust gas treating agent.

The exhaust gas treating agent of the present invention has no practical problem in handling in the air and allows treatment of the exhaust gas containing $NF_3$ at a relatively low temperature. The exhaust gas after treatment substantially contains only nitrogen without containing any by-products requiring subsequent treatment. The treating agent has a practical treating capacity. This permits simplification and size reduction of the apparatus as compared with the conventional case of treating the exhaust gas containing $NF_3$. The treating agent may be renewed in the same manner as in the conventional art. The present invention thus provides remarkable advantages and features in treating the exhaust gas containing $NF_3$.

DESCRIPTION OF THE PREFERRED EMBODIMENTS

The present invention is described more in detail below.

The present invention uses a metal of which surface is fluorinated. This metal is a chemically base metal and a fluoride thereof has substantially no vapor pressure at a working temperature. While various metals may be applicable, it is generally preferable to use a metal selected from the group consisting of those in groups IB, IIB, IIIB, VIIA, and VIII of the periodic table. More specifically, advantageously applicable metals include Mn, Fe, Cu, Zn, and Al. It is known that these metals react with $NF_3$. However, such metals cannot provide superiority over the conventional arts due to one or more of the above mentioned problems when used without adapting the present invention.

The treating agent according to the present invention may contain any metals and other components inactive to the reaction as long as the above mentioned metal is contained as a main component. Alkali metals are active chemical species but are not applicable to the present invention due to their impropriety in chemical and mechanical properties to provide physical formation as in the present invention.

Fe may be improved in treating capacity with coexistence of Cr, of which reason has not been known clearly. It is, however, presumed that Cr has an effect of preventing reduction of functional surfaces (effective surfaces involved in exhaust gas treatment) of the exhaust gas treating agent in the process of treating the exhaust gas. Cr may be added by means of, for example, pulverizing a Fe—Cr alloy. Alternatively, a precipitate obtained through coprecipitation of water-soluble salts may be used as a precursor. In this event, it is preferable that Cr is substantially mixed with Fe. An amount of Cr added is preferably from 1 to 30 percent by weight relative to Fe. No effect can be obtained with an extremely small amount of Cr. On the contrary, it is not expected that a large amount of Cr brings an effect corresponding to the amount added.

Any one of adequate methods can be used to produce a metal having a fluorinated surface. However, it is typical to treat metal particles with a fluorinating agent in a liquid or gaseous state. In this event, it is advantageous to use the metal of which surface is not covered with an oxide film or the like to proceed fluorination more smoothly. In addition, a gaseous fluorinating agent can be used more advantageously when considering subsequent processes after fluorination.

A typical method of providing metal particles is stamp-milling. The stamp milling is a kind of metal grinding techniques with a pulverizer using mechanical shock caused by movement of stamp rods. A raw metal feed for pulverizing is pulverized into fine particles with an allotted stamp-mill through three steps of primary crush, secondary crush, and pulverizing. The stamp-milling is preferably conducted in an inert gas atmosphere to prevent the metal particles from contacting with the air during pulverizing because of the above mentioned reason.

Alternatively, ball milling may be used to provide the metal particles. This method is fundamentally the same as the stamp-milling method in principle of using the mechanical shock. Such an improved mill is used that has obstacles provided on the inner surface of a drum to increase a drop height of the balls, thereby improving a grinding efficiency. The ball milling has an advantage of easy formation of an inert gas atmosphere to prevent the metal particles from contacting with the air. This advantage can provide a higher degree of freedom in designing the apparatus as compared with the stamp-milling.

Without using the mechanical shock, a spray method may be used in which molten metal is sprayed and scattered by means of gas flow, and solidified to form metal particles. While applicable more advantageously to a metal having a low melting point, this method can also be applied to Fe, Cu, Zn, Al, and alloys. In this method, it is preferable to use an inert gas for both the gas flow for spraying and an atmosphere for solidification.

Alternatively, a reduction method may be employed without using the mechanical shock. With this reduction method, a reducible metal compound such as oxides, hydroxides, and halides of a target metal is subjected to reduction with a reducing agent such as hydrogen, carbon monoxide, a lower hydrocarbon, and a lower alcohol. The reduction is conducted while contacting with the reducing agent in an atmosphere furnace or in a column at about 200°–1000° C. This method has an advantage of easy production of metal particles having a relatively large specific area.

It is noted that the metal particles may be produced through any one of adequate methods including the above mentioned ones as long as desired metal particles are obtained.

A method of fluorinating the metal particles is then described. While not being limited specifically, the fluorinating agent may be a gaseous fluorinating agent as mentioned above. Preferable examples of the gaseous fluorinating agent include chemical species having a high thermodynamic potential such as fluorine gas ($F_2$), nitrogen trifluoride gas, and hydrogen fluoride gas (HF). Fluorination is conducted with such chemical species. Usually, a desired level of fluorination can be achieved by means of contacting at or around a room temperature the metal particles with a gas diluted to about 1% with an inert gas such as nitrogen. Fluorination conducted at a high temperature tends to cause the resultant particles to have poor stability due to an excessive fluorination as well as probably non-dense fluorinated films thereon.

A typical reaction vessel such as a fluidized bed or a fixed bed may be used for the treatment of the present invention as long as being capable of contacting uniformly the fluorinating agent with the metal particles. For examples, in the case of a fixed bed type reaction vessel, the metal particles are filled in a fixed bed column through a filling hopper or the like constructed to prevent substantially any contact with the air. Subsequently, the diluted fluorinating agent is passed through the column. A gas flowing rate may be selected adequately, of which measure is from several thousand to several ten $[hr^{-1}]$ in a space velocity.

The specific surface area of the fluorinated metal particles is preferably from 0.1 to 120 $m^2/g$. An excessively small specific surface area results in limitations such as insufficient treating capacity or a higher temperature required for treatment. On the contrary, an excessively large specific surface area requires a larger amount of fluorine for the fluorination treatment, which is disadvantageous by the economical considerations.

The specific surface area of the metal applicable to the present invention may be measured through a BET method.

A rate of fluorination to the metal is connected with the specific surface area of the metal used. There is a correlation between the specific surface area and the rate of fluorination when the metal is fluorinated under the same condition. This indicates that fluorination occurs in a surface of the metal. The rate of fluorination is typically 0.1% by weight or higher. More preferably, the rate of fluorination is from 0.1% to 5% by weight. In case that the rate of fluorination is excessively low, heat generates when the metal particles are exposed to the air, which may cause a problem of deterioration of the fluorinated metal during preservation. On the contrary, an excessively high rate of fluorination results in deteriorated activation at a relatively low temperature and reduced treatment capacity corresponding to the excess fluorination. The rate of fluorination may be determined through quantification of a fluorine content in a predetermined amount of fluorinated metal particles. This quantification may be made by means of, for example, quantifying with fluorine ion electrodes with the metal particles dissolved into acid.

The fluorinated metal particles obtained in the above mentioned manner may be used as they are. However, these particles may advantageously be formed into pellets depending on operational conditions during treatment. This pelletization may be achieved with a typical pelletizer. In this event, molding additives and lubricants may be added. In addition, pelletization may be conducted before fluorination. The additives and lubricants may also be added adequately.

In treating the exhaust gas containing $NF_3$, the exhaust gas is contacted with the resultant metal particles or a molding product thereof (hereinafter, referred to as a treating agent). In this event, the metal particles (or the treating agent) may be loaded in a column having a gas inlet and a gas outlet at the respective ends. The exhaust gas is introduced into the column through the gas inlet and is contacted with the treating agent. The treated exhaust gas is then discharged through the gas outlet. A shape and configuration of the column are not limited specifically as long as the column permits sufficient degree of contact between the exhaust gas and the treating agent. A preferable aspect of the present invention is to use a column having functions of sensing a temperature of the bed of the loaded treating agent, measuring a pressure, and detecting a termination point of the lifetime of the treating agent. The termination of the lifetime of the treating agent may be detected by means of, for example, monitoring a change in weight of the column.

The treating agent is loaded into the column, following which the exhaust gas containing $NF_3$ is passed through the column. In this event, there is no limitation on a concentration of $NF_3$ in the exhaust gas, a superficial velocity and a space velocity of the gas in the column, and gas components other than $NF_3$. It is, however, preferable that conditions for flowing the gas are considered previously if $NF_3$ should be removed substantially completely at the gas outlet of the column.

For example, the $NF_3$ gas concentration may usually be from several ten ppm to several ten percent, and is preferably from several hundred ppm to several percentages. The superficial velocity of the exhaust gas may usually be 50 cm/sec. or lower, and is preferably 20 cm/sec. or lower, though depending on a diameter of the column and a shape of the treating agent. A usual space velocity is 10,000 $hr^{-1}$ or lower. There is no substantial limitation on the pressure as long as it is not extremely high or low. A preferable range of the pressure is from 100 kPa to 200 kPa. The temperature of the treating agent is preferably from 40° to 700° C., and more preferably from 50° to 300° C. The treating capacity will be deteriorated at a temperature of less than 40° C. The treating capacity is nearly same at a temperature higher than 700° C., so that such a high temperature is unnecessary. The exhaust gas may contain gaseous components other than $NF_3$ such as oxygen, nitrogen oxides, hydrogen halides, silane halides, and gaseous silicon compounds. Presence of these gaseous components causes no serious problems.

After passed through the column, the exhaust gas at the outlet is analyzed through gas chromatography. As a result, no $NF_3$ is detected. In addition, the above mentioned reaction produces nitrogen as a by-product gas. This indicates that fluorine in $NF_3$ is fixed to the treating agent by contacting the latter with $NF_3$, while discharging only the nitrogen component.

While the treating capacity depends on the conditions for flowing the exhaust gas, the treating agent can usually treat $NF_3$ of 20 times or more (as converted into 100% $NF_3$) in volume per a unit volume of the treating agent. This can be considered as a satisfactory level of treating capacity.

The metal particles obtained in the present invention are relatively stable in the air and can be handled in a similar manner to the conventional solid treating agents adapted to be used at a high temperature. On the other hand, the nickel-based metal catalyst ground into fine particles and activated with hydrogen at 180°–200° C. generates a considerable amount of heat when handled in the air. The activated catalyst thereafter loses its treating capacity almost completely and is not thus suitable for treatment. Accordingly, it is difficult or even impossible to handle such nickel-based catalyst in the air.

The present invention is now described more in detail in conjunction with a specific set of examples. It is, however, noted that the present invention is not limited to those examples.

EXAMPLE 1

1 kg of zinc pieces subjected to primary crush were placed in a mill with obstacles provided on the inner surface of a drum to increase a drop height of the balls, thereby improving a grinding efficiency. The content of the mill was substituted completely with a dry nitrogen gas. Subsequently, the mill was operated for 24 hours to pulverize the zinc pieces.

The mill was equipped through a hopper with a stainless column having an inner diameter of approximately 16 mm. The column had a gas inlet and a gas outlet at the respective ends thereof. The dry nitrogen gas was passed through the column and the hopper to substitute the contents thereof by nitrogen. Subsequently, the mill outlet was opened to transfer approximately 50 g of the zinc into the column.

Through a separate process, 10 g of the zinc pulverized in the mill was picked up in a stainless dish and was exposed to the air atmosphere. The zinc generated a considerable amount of heat.

Next, $NF_3$ was contacted with the zinc loaded in the column to fluorinate the surface thereof. In this event, the $NF_3$ gas diluted with nitrogen to 0.5% by volume was passed through the column at a flow rate of 1 cm/sec. for 5 hours and the column was dipped in a thermostat kept at 25° C. to control the temperature of the content.

Then, 10 g of the resultant zinc was picked up in a stainless dish and was exposed to the air atmosphere. As a result, no heat was generated. The specific surface area of the resultant zinc was 0.14 $m^2/g$. The rate of fluorination was 0.82% by weight.

The fluorinated zinc particles obtained were mixed with calcium fluoride powder at a ratio of 1:1 in apparent volume. The mixture was molded with an extrusion molding machine into pellets each having an approximate dimension of ⅛ inch×1/84 inch. The calcium fluoride is stable and is inert in this treating reaction.

These pellets were loaded into a stainless column having an inner diameter of approximately 23 mm at a filling height of approximately 200 mm. Subsequently, the $NF_3$ gas diluted with nitrogen to 0.2% by volume was passed through the column, following which the gas at the column outlet was subjected to analysis of components with the passage of time.

Conditions and results of the exhaust gas treatment are given in Table 1 below.

EXAMPLE 2

Example 1 was repeated except that copper was used in place of the zinc. The specific surface area of the resultant copper was 0.11 m²/g. The rate of fluorination was 0.4% by weight.

Conditions and results of the exhaust gas treatment are given in Table 1 below.

EXAMPLE 3

Example 1 was repeated to pulverize aluminum except that the mill was operated for 48 hours, following which 30 g of the aluminum was transferred into the column as in Example 1.

Through a separate process, 5 g of the aluminum pulverized in the mill was picked up in a stainless dish and was exposed to the air atmosphere. The aluminum generated a considerable amount of heat.

Next, $NF_3$ was contacted with the aluminum loaded in the column to fluorinate the surface thereof. In this event, the $NF_3$ gas diluted with nitrogen to 0.1% by volume was passed through the column at a flow rate of 1 cm/sec. for 5 hours and the column was dipped in a thermostat kept at 30° C. to control the temperature of the content.

Then, 5 g of the resultant aluminum was picked up in a stainless dish and was exposed to the air atmosphere. As a result, no heat was generated. The specific surface area of the resultant aluminum was 0.22 m²/g. The rate of fluorination was 0.65% by weight.

The fluorinated aluminum particles obtained were molded and loaded in the column, through which the $NF_3$ gas was passed in the same manner as in Example 1. Results are given in Table 1 below.

EXAMPLE 4

A precipitate obtained through reaction between ferric sulfate and sodium hydroxide was oxidized with the air. The resultant wet cake of ferric oxide was dried and molded with the extrusion molding machine into pellets each having an approximate dimension of ⅛ inch×1/16 inch. Then, 80 g of the pellets was loaded into a 100-cc stainless column. Subsequently, a hydrogen gas diluted with nitrogen to 50% by volume was passed through the column while heating at 500° C. to reduce the pellets over 15 hours.

10 g of the reduced iron oxide (iron) pellet was picked up in a stainless dish and was exposed to the air atmosphere. The iron generated a considerable amount of heat.

Next, $NF_3$ was contacted with the pellets loaded in the column to fluorinate the surface thereof. In this event, the $NF_3$ gas diluted with nitrogen to 1% by volume was passed through the column at a flow rate of 2 cm/sec. for 5 hours and the column was dipped in a thermostat kept at 20° C. to control the temperature of the content.

Then, 10 g of the resultant iron pellet was picked up in a stainless dish and was exposed to the air atmosphere. As a result, no heat was generated. The specific surface area of the resultant iron pellet was 30 m²/g. The rate of fluorination was 1.2% by weight.

These fluorinated iron pellets were loaded into a stainless column having an inner diameter of approximately 23 mm at a filling height of approximately 200 mm. Subsequently, the $NF_3$ gas diluted with nitrogen to 0.2% by volume was passed through the column, following which the gas at the column outlet was subjected to analysis of components with the passage of time.

Conditions and results of the exhaust gas treatment are given in Table 1 below.

In Examples 1 through 4, the treating agent had a treating activity to $NF_3$, and no $NF_3$ was contained in the gas at the column outlet. In addition, there were no such components that require subsequent treatment such as nitrogen oxides. The $NF_3$ gas was passed through the column under approximately an atmospheric pressure.

TABLE 1

| | | CONDITIONS | | RESULTS | | |
| | | | | | GAS ANALYSIS | |
| EXAMPLE | FLUORINATED METAL | TEMPERATURE °C. | GAS FLOW RATE cm/s | BREAK-THROUGH TIME min. | BEFORE BREAKTHROUGH ppm | |
| | | | | | NOx | $NF_3$ |
| 1 | Zn | 50 | 5 | 180 | 10 or lower | 10 or lower |
| | | 100 | 10 | 230 | 10 or lower | 10 or lower |
| 2 | Cu | 150 | 10 | 340 | 10 or lower | 10 or lower |
| 3 | Al | 50 | 5 | 140 | 10 or lower | 10 or lower |
| | | 200 | 15 | 290 | 10 or lower | 10 or lower |
| 4 | Fe | 50 | 5 | 330 | 10 or lower | 10 or lower |
| | | 200 | 10 | 1380 | 10 or lower | 10 or lower |
| | | 350 | 15 | 1100 | 10 or lower | 10 or lower |

Gas analytical values before breakthrough: measured through TCD gas chromatography with a detection limit of 10 ppm.

EXAMPLE 5

Commercially available fine powder of reduced iron was further reduced and was molded with the extrusion molding machine into pellets each having an approximate dimension of 1/8 inch×1/84 inch. These pellets were loaded into a column. Subsequently, $NF_3$ diluted with nitrogen to 0.3% by volume was passed through the column at a flow rate of 10 cm/sec. for 5 hours. In this event, the column was dipped in a thermostat kept at 20° C. to control the temperature of the content. The specific surface area of the resultant iron pellet was 140 m²/g. The rate of fluorination was 4.7% by weight.

These fluorinated iron pellets were loaded into a stainless column having an inner diameter of approximately 23 mm at a filling height of approximately 200 mm. Subsequently, the $NF_3$ gas diluted with nitrogen to 0.2% by volume was passed through the column at 50° C., following which the gas at the column outlet was subjected to analysis with the passage of time. As a result, breakthrough was observed after 300 minutes from initiation of the reaction.

EXAMPLE 6

There were prepared two kinds of aqueous solutions each containing 10% iron nitrate (III) or 10% chromium nitrate (III). Then these solutions were mixed in a mixing ratio of 100:15. A sodium hydroxide solution was added to the mixed solution until the solution exhibited weak alkali to produce precipitate. The precipitate was rinsed, filtered, and dried. The dried product was pelletized into tablets of 3 mm×3 mmφ. The tablet with the 15% chromium content was reduced and was then fluorinated (to the fluorination rate of approximately 1%) with $NF_3$ gas diluted to 0.05% by volume. The resultant tablet was used as an exhaust gas treating agent.

30 g of the exhaust gas treating agent was loaded in a column having an inner diameter of 16 mm. The temperature of the column was set to 200° C. Then, the $NF_3$ gas diluted to 1% by volume was passed through the column at 1200 cc/min. (corresponding to the superficial velocity of approximately 10 cm/sec.) with nitrogen serving as a balance gas. As a result, $NF_3$ was detected after 240 minutes from initiation of the reaction.

COMPARATIVE EXAMPLE 1

Example 1 was repeated to load activated carbon. The $NF_3$ gas diluted to 0.2% by volume was passed through this column at the gas flow rate of 10 cm/sec. The gas at the outlet was analyzed, which indicated that little or no $NF_3$ gas was removed.

The column was then heated to 500° C., through which the $NF_3$ gas diluted to 0.2% by volume was passed at the gas flow rate of 10 cm/sec. Analysis of the gas at the outlet results in detecting $CF_4$ and a trace of dinitrogen difluoride and not detecting $NF_3$ gas. $CF_4$ has less or no toxicity, and thus there is no restriction on discharge of $CF_4$ into the air. However, $CF_4$ is focused as a chemical species affecting the global warming.

COMPARATIVE EXAMPLE 2

A column similar to that used in Example 1 was loaded with metal silicon granules and was heated to 100° C. The $NF_3$ gas diluted to 0.2% by volume was passed through this column at a gas flow rate of 10 cm/sec. The gas at the outlet was analyzed to find that little or no $NF_3$ was removed.

The column was then heated to 500° C., through which the $NF_3$ gas diluted to 0.2% by volume was passed at the gas flow rate of 10 cm/sec. Analysis of the gas at the outlet results in detecting of silicon tetrafluoride having a strong odor and no $NF_3$. The silicon tetrafluoride should not be discharged into the air as it is due to its toxicity, and thus requires a subsequent treatment such as rinsing with water by using a hydrolyzing property thereof.

COMPARATIVE EXAMPLE 3

A nickel-based catalyst was crushed. Particles having particle diameters of around 1 mm were sieved. These particles were loaded into the same column as in Example 1. The column was then heated to 200° C. Hydrogen was passed through this column for 20 hours, following which the column was cooled to a room temperature while passing nitrogen therethrough. The $NF_3$ gas diluted to 0.2% by volume was passed at the gas flow rate of 15 cm/sec. Analysis of the gas at the outlet indicated that no $NF_3$ was detected in 10 minutes from initiation of the reaction and that $NF_3$ of approximately 100 ppm was detected thereafter.

Subsequently, hydrogen was passed through the column. The content of the column was then treated with nitrogen. The treated granulated nickel-based catalyst was picked up in a dish made of stainless steel and was exposed to the air. As a result, the catalyst generated a large amount of heat.

COMPARATIVE EXAMPLE 4

A binder (PVA solution) was added to fine particles of iron obtained through ball milling, which was molded with a disc pelleter into pellets each being approximately 3 mm×3 mmφ. These pellets were thermally treated in the air at 500° C. The resultant produces were used as the exhaust gas treating agent.

Subsequently, 30 g of these exhaust gas treating agent was loaded into a column of 16 mm in inner diameter. The column was heated to 400° C., through which the $NF_3$ gas diluted to 1% by volume was passed at 1200 cc/min. (corresponding to the superficial velocity of approximately 10 cm/sec.) with nitrogen serving as a balance gas. The gas at the column outlet was taken every 8 minutes to determine presence of $NF_3$ through the gas chromatography. As a result, $NF_3$ was detected after 56 minutes from initiation of passing the exhaust gas containing $NF_3$.

What is claimed is:

1. An exhaust gas treating agent for treating an exhaust gas containing nitrogen trifluoride comprising as a main component particles consisting essentially of a metal having a fluorinated surface which decomposes said nitrogen trifluoride, wherein the fluorinated surface is provided by fluorine incorporated into a surface of the metal at a rate of fluorination of 0.1% to 5% by weight, by a fluorination process carried out at about room temperature.

2. An exhaust gas treating agent as claimed in claim 1, wherein a specific surface area of the fluorinated metal is 0.1 m²/g or larger.

3. An exhaust gas treating agent as claimed in claim 2, wherein the agent has a fluorine content of 0.1% by weight or higher relative to the metal.

4. An exhaust gas treating agent as claimed in claim 1, wherein the agent has a fluorine content of 0.1% by weight or higher relative to the metal.

5. An exhaust gas treating agent as claimed in any one of claims 1 through 3, wherein the metal is selected from the group consisting of iron, copper, zinc, aluminum, manganese, alloys containing as effective components these metals, and a mixture thereof.

6. An exhaust gas treating agent as claimed in claim 5, wherein the metal is iron and the agent contains from 1% to 30% by weight of chromium relative to the iron, the chromium being substantially uniformly mixed with the iron.

7. The exhaust gas treating agent of claim 1, wherein the fluorination process is carried out at about 20°–30° C.

8. The exhaust gas treating agent of claim 1, wherein the fluorination process comprises the step of contacting the metal with a gaseous fluorinating agent.

9. The exhaust gas treating agent of claim 8, wherein the gaseous fluorinating agent is $F_2$, $NF_3$, or HF.

* * * * *